US011296785B2

(12) United States Patent
Magri et al.

(10) Patent No.: US 11,296,785 B2
(45) Date of Patent: Apr. 5, 2022

(54) METHODS AND APPARATUS FOR FIBER OPTIC LINE FAULT DETERMINATION

(71) Applicant: Telefonaktiebolaget LM Ericsson (publ), Stockholm (SE)

(72) Inventors: Roberto Magri, Genoa (IT); Alberto Deho, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/962,013

(22) PCT Filed: Feb. 9, 2018

(86) PCT No.: PCT/EP2018/053323
§ 371 (c)(1),
(2) Date: Jul. 14, 2020

(87) PCT Pub. No.: WO2019/154512
PCT Pub. Date: Aug. 15, 2019

(65) Prior Publication Data
US 2021/0058153 A1  Feb. 25, 2021

(51) Int. Cl.
*H04B 10/077* (2013.01)
(52) U.S. Cl.
CPC ..... *H04B 10/0771* (2013.01); *H04B 10/0779* (2013.01)
(58) Field of Classification Search
CPC .................. H04B 10/0771; H04B 10/0779
USPC ......................................................... 398/33
See application file for complete search history.

(56) References Cited

U.S. PATENT DOCUMENTS

| 4,902,087 A * | 2/1990 | Lins ......................... G02F 1/11 |
| | | 359/305 |
| 8,477,596 B2 * | 7/2013 | Trisno ................ H04Q 11/0062 |
| | | 370/217 |
| 9,641,245 B2 * | 5/2017 | Al-Walaie .......... H04B 10/0771 |
| 10,103,850 B2 * | 10/2018 | Chandra ................. H04L 49/30 |
| 10,205,553 B2 * | 2/2019 | Magri ................... H04J 14/029 |
| 2005/0180316 A1 * | 8/2005 | Chan ................... H04J 14/0291 |
| | | 370/216 |

(Continued)

OTHER PUBLICATIONS

PCT International Search Report and Written Opinion dated Nov. 20, 2018 for International Application PCT/EP2018/053323, 10 pages.

(Continued)

*Primary Examiner* — Dalzid E Singh
(74) *Attorney, Agent, or Firm* — Sage Patent Group (57) ABSTRACT

There is provided an apparatus for fiber optic line continuity detection. The apparatus comprises an optical input connectable to a first optical fiber of a fiber optic line, an optical output connectable to a second optical fiber of the fiber optic line an optical interface unit configured to transmit and receive optical signals; and an optical switch having a first configuration and a second configuration. In the first configuration the optical switch is configured to pass optical signals received at the optical input to the optical interface unit and to pass optical signals received from the optical interface unit to the optical output. Whereas, in the second configuration the optical switch is configured to pass optical signals received at the optical input to the optical output.

17 Claims, 6 Drawing Sheets

(56) References Cited

U.S. PATENT DOCUMENTS

| | | | | |
|---|---|---|---|---|
| 2007/0140688 A1* | 6/2007 | Patel | ............... | H04B 10/077 |
| | | | | 398/5 |
| 2008/0193133 A1* | 8/2008 | Krug | ............... | G02F 1/3132 |
| | | | | 398/83 |
| 2014/0072295 A1* | 3/2014 | Wakaki | ............. | H04B 10/038 |
| | | | | 398/5 |

OTHER PUBLICATIONS

Nokia, Technology overview, Technical White Paper, "Evolution to Centralized RAN With Mobile Fronthaul", 14 pages.

Optical Zonu Corporation, "iSFC Transceiver With Built-In Micro-OTDR", 3 pages.

* cited by examiner

METHODS AND APPARATUS FOR FIBER OPTIC LINE FAULT DETERMINATION

CROSS-REFERENCE TO RELATED APPLICATIONS

This application is a 35 U.S.C. § 371 national stage application for International Application No. PCT/EP2018/053323, entitled "METHODS AND APPARATUS FOR FIBER OPTIC LINE FAULT DETERMINATION", filed on Feb. 9, 2018, the disclosures and contents of which are hereby incorporated by reference in their entireties.

TECHNICAL FIELD

The present disclosure relates methods and apparatus for fault determination in fiber optic communication systems. In particular, present disclosure relates to the determination of continuity of fiber optic lines.

BACKGROUND

Fiber optic communication systems are widely used to provide high-speed, low latency communication links. As a result, fiber optic systems are often used in communication links where uptime is a high priority. For example fiber optic systems may be used in as part of the backhaul of a C-RAN system where link failure can affect large numbers of end users simultaneously.

It is typically not feasible to eliminate failures of individual links, such as fiber optic links, due to the diverse and often challenging environments in which these links must exist. As such, serviceability of such fiber optic systems are often paramount. Various technologies and strategies have been developed to aid in troubleshooting faults on such links and, ultimately, reduce the Mean Time to Repair (MTTR). Reduction of the MTTR usually has a positive impact on the total cost of ownership (TCO) of the communication network infrastructure, as well as providing reliability benefits to the end users.

The common failure modes of fiber optic systems include loss of continuity across the fiber optic line, such as by breakage or other damage of the optical fibers. Other common failure modes include failure of individual optical transceivers (or other elements such as amplifiers), such as laser failure in the transceiver.

As such, a typical problem for operators of such fiber optic communication systems is to identify the root cause when traffic loss occurs given the different possible failure modes. In particular, for remote nodes, it may be difficult to discriminate between a remote system failure (such as a power failure or a laser failure) and a loss of continuity across the fiber optic line. Typically both issues appear as a Loss of Signal (LOS) at the receiver side.

This can be a particular problem in C-RAN systems where the remote transceivers are typically accessed only through an out-of-band (OOB) supervisory channel or in-band operations, administration and management (OA&M) information embedded data transmitted across the link. If a transceiver at a main site encounters a loss of signal from the remote transceiver such OOB and OA&M methods cannot be relied upon to isolate the fault.

As such, if a transceiver at a main site encounters a loss of signal from the remote transceiver then further investigation is needed to determine if the fault is at the remote site itself, e.g. a remote site transceiver failure, or a loss of continuity of the fiber optic line, e.g. due to a break which may be at any point along the line.

Various techniques are known in the art to investigate this, each having their own drawbacks such as:

The use of external sources at the remote site to check fiber continuity. This requires additional monitoring wavelengths to be coupled in the fiber optic communication channel, which in turn requires additional filters and components at the remote site. Such additional infrastructure modifications are often not cost effective and introduce added complexity which can be disadvantageous.

Optical Time Domain Reflectometry (OTDR), which can be used to detect a break in the fiber optic line. This typically requires expensive fiber test systems in order to be reliable and also requires specific calibration to the line ahead of time.

SUMMARY

According to a first aspect, there is provided an apparatus for fiber optic line fault determination. The apparatus comprises an optical input connectable to a first optical fiber of a fiber optic line, and an optical output connectable to a second optical fiber of the fiber optic line. The apparatus also comprises an optical interface (such as an optical transceiver) configured to transmit and receive optical signals, and an optical switch having a first configuration and a second configuration. In the first configuration the optical switch is configured to pass optical signals received at the optical input to the optical interface, and to pass optical signals received from the optical interface to the optical output. In the second configuration the optical switch is configured to pass optical signals received at the optical input to the optical output. Additionally, the optical switch is arranged to transition from the first configuration to the second configuration in response to the optical interface being in a failure state.

In this way, should the optical interface unit enter a failure state a line side loopback of optical signals incoming to the apparatus is provided. This provides systems attempting to communicate with the apparatus via the fiber optic line with an indication as to whether the fiber optic line still has continuity. In particular, such a system receiving its own transmitted signals looped back in this way would be able to determine that the fiber optic line has continuity.

The failure state of the optical interface may comprise a loss of power at the optical interface and the optical switch and the optical interface may be arranged to use a common power source. The second configuration of the optical switch may also correspond to the optical switch being powered down.

In this way a loopback of optical signals incoming to the apparatus would automatically occur should the optical interface be subject to a power failure. This would enable systems attempting to communicate with the apparatus via the fiber optic line with a failsafe indication for distinguishing between a loss of continuity of the fiber optic line and a simple power failure of the optical interface.

The apparatus may further comprise a fault detection unit configured to detect the failure state. Optionally the fault detection unit may be configured to detect the failure state by polling the optical interface.

The optical switch may comprise a photonic microring resonator optical switch, e.g. based on silicon. In some aspects, a microring resonator optical switch is configured to transition between the first configuration and the second configuration using any one of: thermo-optic control; electro-optic control; or optical tuning. Of these thermo-optic control is preferred due to its reliability.

The optical switch may comprise a microelectromechanical system, MEMS, optical switch and/or a piezoelectric optical switch.

According to a second aspect there is provided a method of operating an optical node connected to a fiber optic line comprising a first and second optical fiber. The method comprises detecting a failure state of the optical node. As part of the method, in response to the optical node being in a failure state, the method comprises transitioning an optical switch of the optical node to a configuration in which the optical switch is configured to pass optical signals, received at the optical node via the first optical fiber, along the second optical fiber.

According to a third aspect there is provided a method of operating a fiber optic communication system. The fiber optic communication system comprises a local optical node connected to a remote optical node via a fiber optic line comprising a first and second optical fibers. The method comprises, at the remote optical node and in response to the remote optical node being in a failure state, transitioning an optical switch of the remote optical node to a configuration passing optical signals received at the remote optical node from the local optical node via the first optical fiber to the second optical fiber for transmission to the local optical node. The method further comprises, at the local optical node, transmitting a signal from the local optical node towards the remote optical node via the first optical fiber. Also at the local optical node the method comprises determining if the transmitted signal is received at the local optical node via the second optical fiber of the fiber optic line, and if so, determining that the fiber optic line has continuity.

According to a fourth aspect there is provided a method for fiber continuity detection in a fiber optic line connecting a local optical node to a remote fiber optic system comprising an apparatus according to the first aspect described above. The method comprises transmitting a signal from the local optical node towards the remote optical node via a first optical fiber of the fiber optic line. Also in response to receiving the transmitted signal at the local optical node via a second optical fiber of the fiber optic line, the method comprises determining that the fiber optic line has continuity and determining that the remote optical node is in a failure state.

In the methods provided in the third and fourth aspects it will be appreciated that the signal may be a test signal. Also the transmitting of the test signal may be in response to detecting a loss of signal (such as a partial or total loss of traffic) at the local optical node.

As set out in respect of the first aspect, it will be appreciated that in the second third and fourth aspects above the failure state of the optical interface may comprise a loss of power at the optical interface and the optical switch and the optical interface may be arranged to use a common power source. The second configuration of the optical switch may also correspond to the optical switch being powered down.

Optionally, the failure state of the optical interface comprises any one of: a transmitter laser failure; an optical diode failure, and so on.

According to a fifth aspect there is provides a system for fiber optic line fault determination. The system comprises a local optical node connected to a remote optical node by a first optical fiber and a second optical fiber. The remote optical node comprises a remote optical interface unit connected to the first optical fiber and the second optical fiber via an optical switch. The local optical node comprising a local optical interface unit connected to the first optical fiber and the second optical fiber. The optical switch has a first configuration and a second configuration. In the first configuration the optical switch is configured to optically connect the first optical fiber to the optical interface unit, and to optically connect the second optical fiber to the optical interface unit enabling the optical interface unit to transmit and receive optical signals via the first optical fiber and the second optical fiber to the local optical interface unit. In the second configuration the optical switch is configured to optically connect the first optical fiber to the second optical fiber such that incoming optical signals from the local optical interface unit via the first optical fiber are redirected to the local optical interface unit via the second optical fiber. The optical switch is arranged to transition from the first configuration to the second configuration in response to the optical interface unit being in a failure state.

There is also provided a system for fiber continuity detection in a fiber optic line connecting a local optical node to a remote optical node comprising an apparatus according to the first aspect described above. The system comprises a first unit for transmitting a signal from the local optical node towards the remote optical node via a first optical fiber of the fiber optic line. The system also comprises a second unit for determining that the fiber optic line has continuity and determining that the remote optical node is in a failure state, in response to receiving the transmitted signal at the local optical node via a second optical fiber of the fiber optic line.

There is also provided a computer program comprising instructions which, when executed on at least one processor cause the at least one processor to carry out any of the methods described above. There is also provided a carrier containing such a computer program, wherein the carrier is one of an electronic signal, optical signal, radio signal or computer readable storage medium. There is also provided a computer readable storage medium having stored thereon such a computer program.

BRIEF DESCRIPTION OF THE DRAWINGS

Embodiments of the disclosure will now be described, by way of example only, with reference to the accompanying drawings, in which.

DETAILED DESCRIPTION

In the description that follows and in the figures, certain embodiments of the disclosure are described. However, it will be appreciated that the disclosure is not limited to the embodiments that are described and that some embodiments may not include all of the features that are described below. It will be evident, however, that various modifications and changes may be made herein without departing from the broader spirit and scope of the disclosure as set forth in the appended claims.

Figure 1:
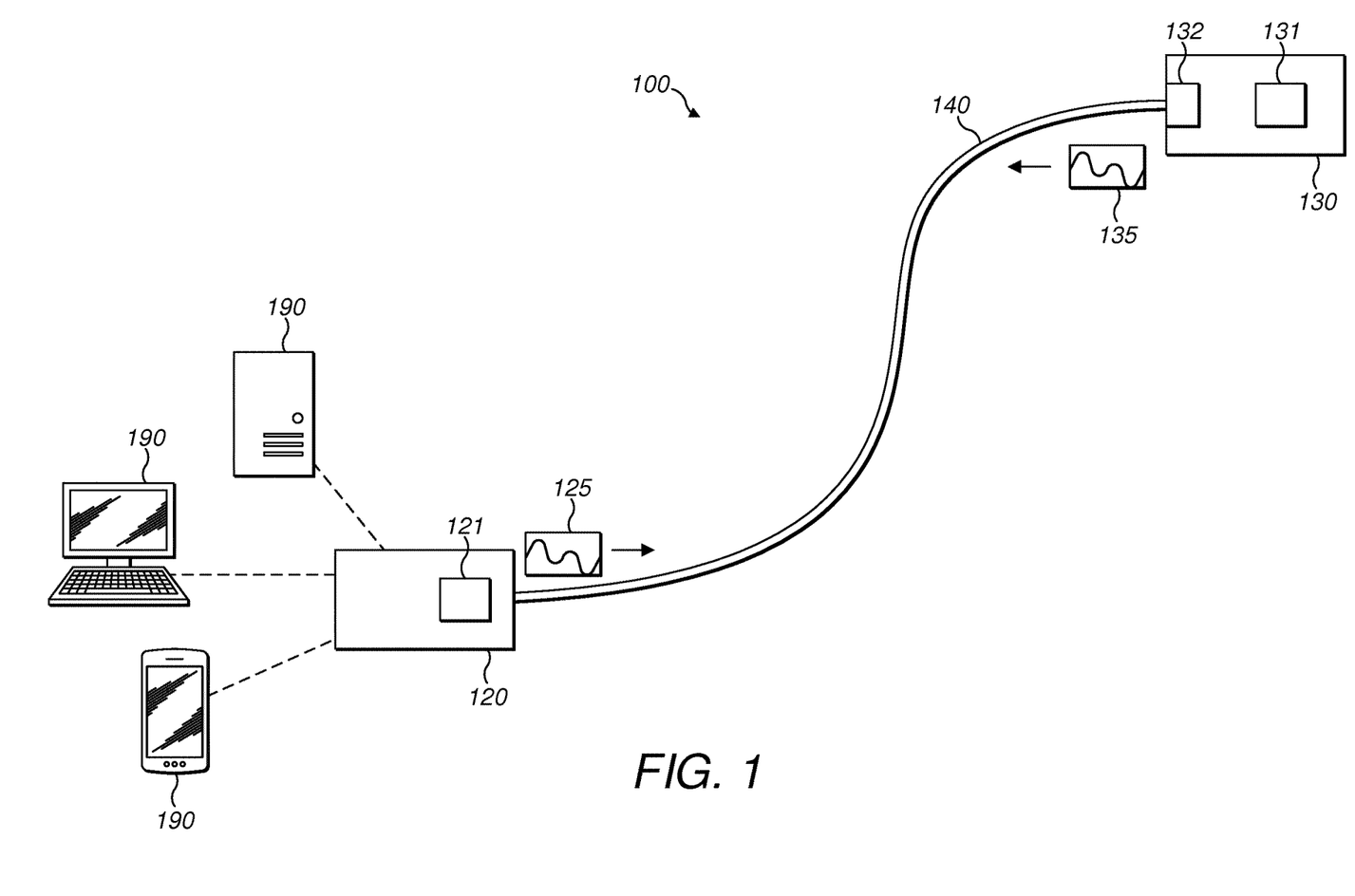
FIG. 1 schematically illustrates an example fiber optic communication system.

FIG. 1 schematically illustrates an example fiber optic communication system 100. The fiber optic communication system 100 comprises two optical nodes (or systems) 120, 130 connected via a fiber optic line 140. The two optical nodes 120, 130 are referred to herein as a main node 120, and a remote node 130.

Each node (or system) 120, 130 is usually situated at a respective different geographic location or site. At each node 120, 130 there is a respective fiber optic interface unit (referred to herein as an optical interface unit) 121, 131 configured to send and receive optical signals 125, 135 via the fiber optic line. As such, the optical interface unit 121, 131, for a respective node 120, 130 provides connectivity for the node 120, 130 to the fiber optic line. An optical signal 125, 135 may encode data according to a suitable network communication protocol, thereby allowing data transmission and reception between the two nodes 120, 130, and ultimately their respective sites. Examples of such network communication protocols include any of: Fiber Channel, Ethernet, synchronous optical networking (SONET), Optical Transport Network (OTN) and so on. Each interface 121, 131 is, or comprises, one or more respective optical transceivers. The optical transceivers are configured to generate an optical signal 125, 135 for transmission and/or detect a received optical signal 125, 135. Typically, an optical transceiver comprises a laser for generating an optical signal 125, 135 based on a received electronic signal, and/or a photo-diode for generating an electronic signal corresponding to a received optical signal 125, 135.

It will be understood that the fiber optic system 100 typically provides a point-to-point (P2P) communications link between the two nodes 120, 130. As shown in FIG. 1, a node 120 may also be serving multiple other devices or end-points 190 which themselves may be using the node 120 to communicate with other nodes 130 of the fiber optic communication system 100 via the fiber optic line 140. As such it will be appreciated that a given node 120, 130 may in some cases only be an intermediate point along a communication path. Indeed, such a fiber optic system (or systems) 100 is often used as part of a larger communication system. In some aspects, the node 120 may be referred to as a local, or main, optical node, and the node 130 may be referred to as a remote optical node.

For example, the fiber optic system 100 may be part of the fronthaul of a radio access network (RAN), such as a centralized radio access network (C-RAN). In this example the main node 120 may comprise a baseband unit. The remote node 130 may comprise a remote radio unit (RRU). In this way the fiber optic system 100 may provide the fronthaul communication link between the RRU and the baseband unit.

In another example, the fiber optic system 100 may be part of the backhaul of a RAN, such as a C-RAN. In this example the remote node 130 may comprise a baseband unit or radio base station. The main node 120 may be part of the core network (or an aggregation system ultimately connected to the core network). In this way the fiber optic system 100 may provide at least part of the backhaul communication link between the baseband unit and the core network.

Additionally, or alternatively, an optical interface unit 121, 131 may comprise an amplifier for optical signals 125, 135. For example, the respective node 120, 130 may be an intermediate point on a longer fiber optic line run. In such scenarios amplifiers, such as optical amplifiers are used to amplify an optical signal 125, 135 that otherwise would not be strong enough to traverse the entire fiber optic cable run. Such an amplifier may convert incoming optical signals to electronic signals and then re-generate a new optical signal for re-transmission. Such amplifiers typically comprise an optical transceiver. Alternatively an amplifier may simply optically amplify the incoming optical signal without any conversion.

The fiber optic line 140 provides a first optical signal path for optical signals 125 transmitted from the main interface 121 to the remote interface 131. Similarly, the fiber optic line 140 provides a second optical signal path for optical signals 135 transmitted from the remote interface 131 to the main interface 121. For example, the first optical signal path is provided by a first optical fiber of the fiber optic line, and the second optical signal path is provided by a second optical fiber of the fiber optic line as described shortly below. As such, the nodes 120,130 are connected by a first optical fiber and a second optical fiber. Each of the optical fibers carries optical signals in only a single direction.

In the preset embodiment the remote node 130 is configured to, in response to a failure of the remote interface 131 (such as a power failure of the remote interface 131) join the first optical signal path and the second optical signal path at the remote interface 131. As a result, an optical signal 125 transmitted from the main interface 121 along the fiber optic line 140 is redirected at the remote interface 131 back along the fiber optic line 140 for reception at the main node 120 by the main optical interface unit 121, in the event of the failure of the remote interface 131. For example, this is done by means of an optical switch 132, described shortly below, in the remote node 130.

In this way it will be appreciated that the main interface 121 may distinguish between a failure of the remote interface 131 and a loss of continuity of the fiber optic line (such as a break in the fiber optic line). In the case of a loss of continuity of the fiber optic line 140, a signal 125 transmitted by the main interface 121 on the first optical fiber will not be successfully returned to the main node 120 by the second optical fiber. Conversely, should there be no loss of continuity of the fiber optic line 140, and instead there is a failure of the remote interface 131, the main node 130 may verify (or determine) that there is no loss of continuity. This verification may be determined if the main node 120 receives on the second optical fiber an optical signal 125 transmitted from the main interface 121 on the first optical fiber.

In this way remote site failures may be more quickly determined without the need for specific, and often time consuming, fiber optic line testing, using specialized equipment, to rule out damage to the fiber optic line 140 itself. Thus the MTTR may be advantageously reduced.

Figure 2A:
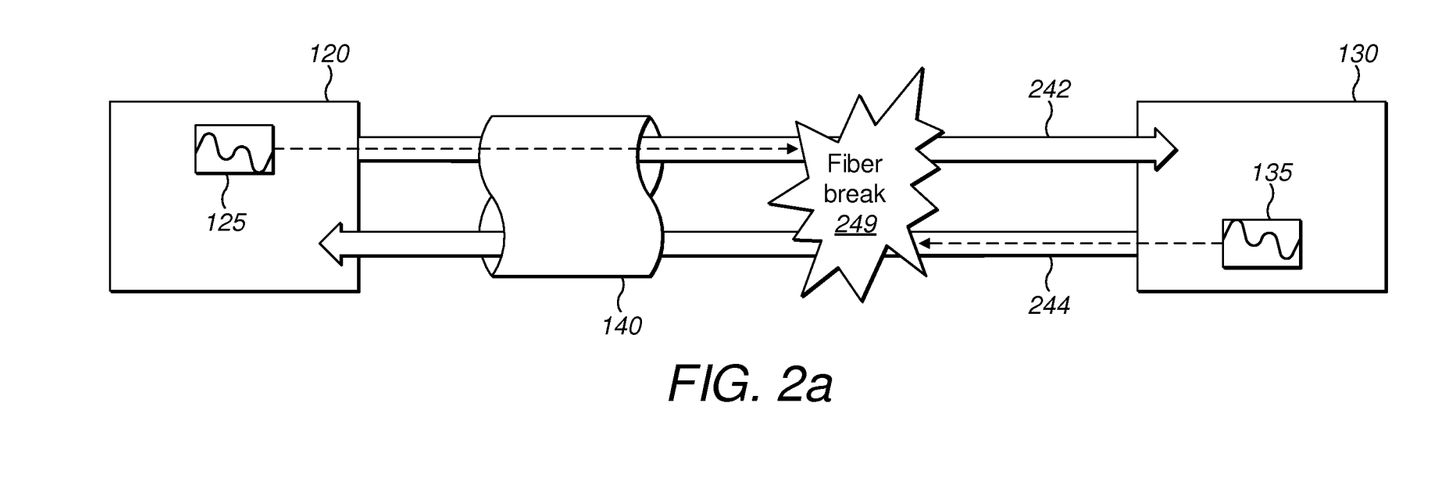
FIG. 2a illustrates a failure scenario for a fiber optic communication system, such as the fiber optic communication system in FIG. 1, involving a loss of fiber continuity.

FIG. 2*a* schematically illustrates an example of a fiber optic communication system 100 as described above, but with a loss of fiber continuity. In the system 100 the fiber optic line 140 comprises a first optical fiber 242 and a second optical fiber 244. Each of the first and second optical fibers 242, 244 connect the main node 120 to the remote node 130.

The main node 120 is configured to transmit optical signals 125 via the first optical fiber 242. The main node 120 is also configured to receive optical signals 135 via the second optical fiber 244. Conversely, the remote node 130 is configured to transmit optical signals 135 via the second optical fiber 244. The remote node 130 is also configured to receive optical signals 125 via the first optical fiber 242.

In this way it will be appreciated that the first optical fiber 242 carries optical signals 125 transmitted from the main node 120 to the remote node 130 and the second optical fiber 244 carries optical signals 135 transmitted from the remote node 130 to the main node 120. From the point of view of the remote node 130 the second optical fiber 244 may be thought of as a transmission optical fiber and the first optical fiber 242 may be thought of as a reception optical fiber. Of course these labels are inverted from the point of view of the main node 120.

FIG. 2*a* illustrates a failure scenario involving a loss of fiber continuity. As shown in FIG. 2*a* there is a loss of fiber continuity 249 between the main node 120 and the remote node 130. A loss of continuity of a fiber optic line 140 typically comprises damage or modification of the fiber optic line 140 such that signals 125, 135 are prevented from traversing the line 140 in at least one direction. This may be caused by a break in one or more optical fibers 242, 244 making up the fiber optic line 140. However, this may also be caused by damage to one or more of the optical fibers 242, 244 short of a break. For example damage to the outer sheath or coating of an optical fiber 242, 244 may cause signal loss at the site of the damage such that signals 125, 135 can no longer transverse the entire optical fiber.

For the purposes of the discussion below loss of continuity is in the form of a fiber break 249 in the fiber optic line 140. In this particular example, a break in the second optical fiber 244 is located between the main node 120 and the remote node 120. The result of the fiber break 249 is that optical signals 135 transmitted by the remote node 130 to the main node 120 via the second optical fiber 244 are unable to reach the main node 120. However, it will be appreciated that this discussion may apply analogously to other losses in fiber continuity which have the same effect.

The main node 120 will not receive any signals 135 via the second optical fiber 244. Instead the main node 120 will experience a total loss of signal from the remote node 130.

Figure 2B:
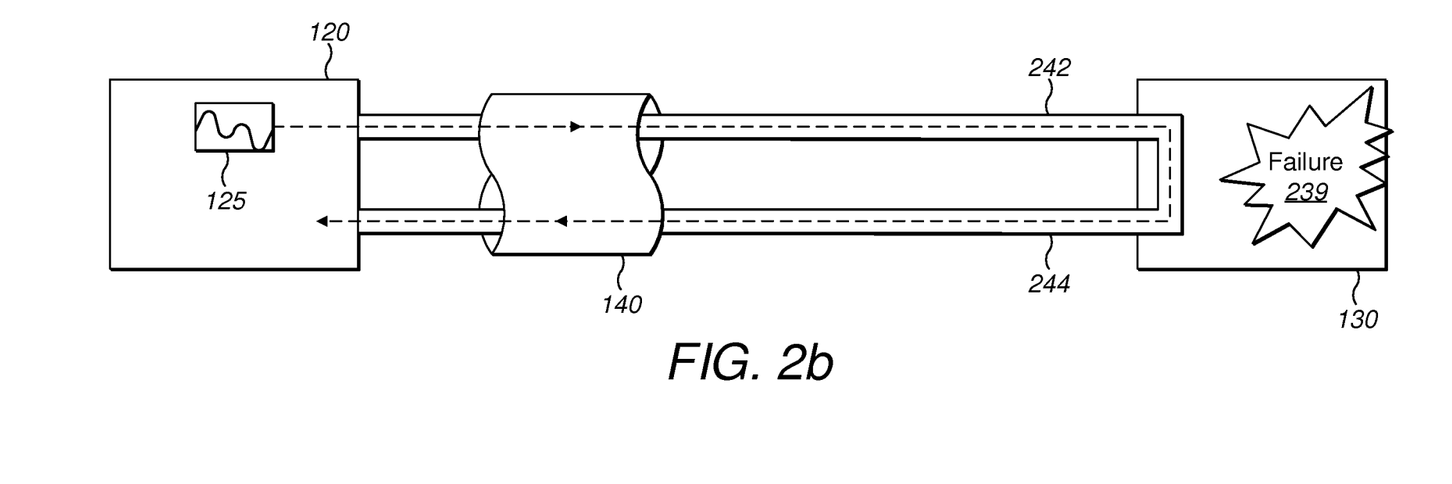
FIG. 2b illustrates a failure scenario for a fiber optic communication system, such as the fiber optic communication system in FIG. 1, involving a failure at a remote site.

In FIG. 2*b* an alternative failure scenario is illustrated. As shown in FIG. 2*b* there is a failure 239 at the remote node 130. This remote node failure 239 prevents the remote node 130 from transmitting optical signals 135. Such a remote node failure 239 may comprise any of: a power failure (or loss of power) at the remote node; a failure of a transmission laser or amplifier in the remote optical interface unit 131; a failure of an optical diode in the remote optical interface unit 131 and so on. The main node 120 will not receive any signals 135, transmitted by the remote node 130, via the second optical fiber 244.

In some examples, the main node 120 would experience a total loss of signal from the remote node 130. At the main node 120 the remote node failure 239 would produce the same loss of signal as the fiber break 249 described above.

However, as set out in relation to FIG. 1, the remote node, in the event of the failure such as the remote node failure 239, is configured to redirect the optical signal 125 transmitted from main node 120 along the first optical fiber 242 back along the second optical fiber 244 for reception at the main node 120. As such, the main node 120 may determine that there is no loss of fiber continuity (such as the fiber break 249 of FIG. 2*a*) based on the main node 120 receiving optical signals 125 looped back to the main node by the remote node.

It will be appreciated that in the scenario set out in FIG. 2*a* above such looped back signals 125 would not be received by the main node as a fiber break in either the first optical fiber or the second optical fiber would prevent such a signal, transmitted by the main node 120, from reaching the main node 120.

In this way it is clear that the scenarios of FIGS. 2*a* and 2*b* may be distinguished by the main node 120 using the presence or otherwise of the loopback signal 125, as described above in reference to FIG. 1.

Figure 3A:
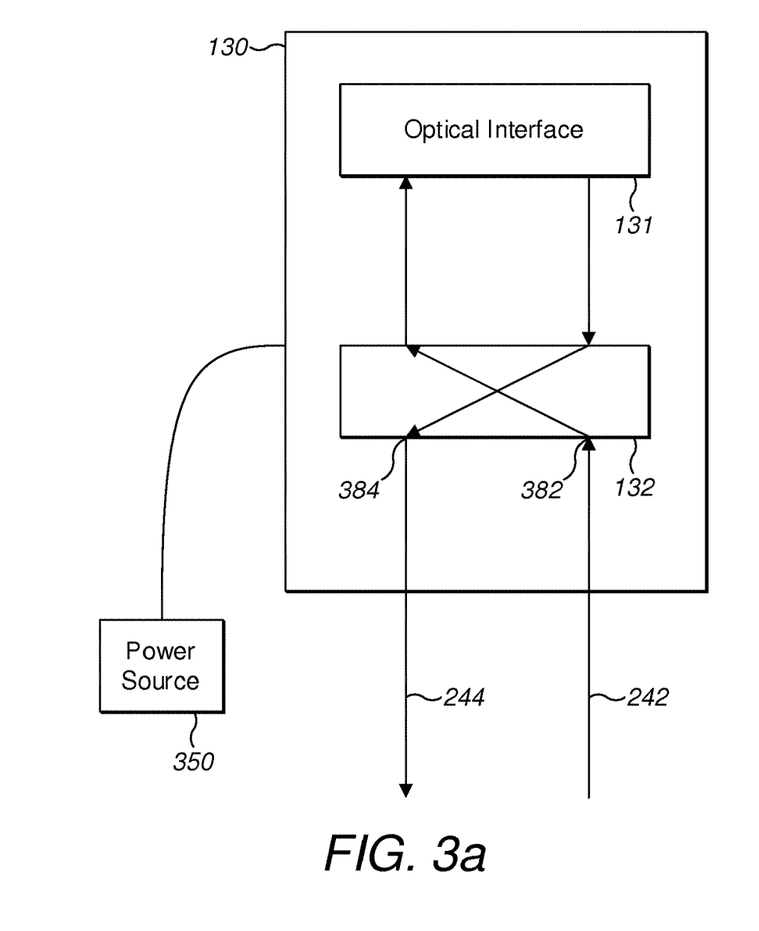
FIG. 3a schematically illustrates a remote site, in a powered scenario.
Figure 3B:
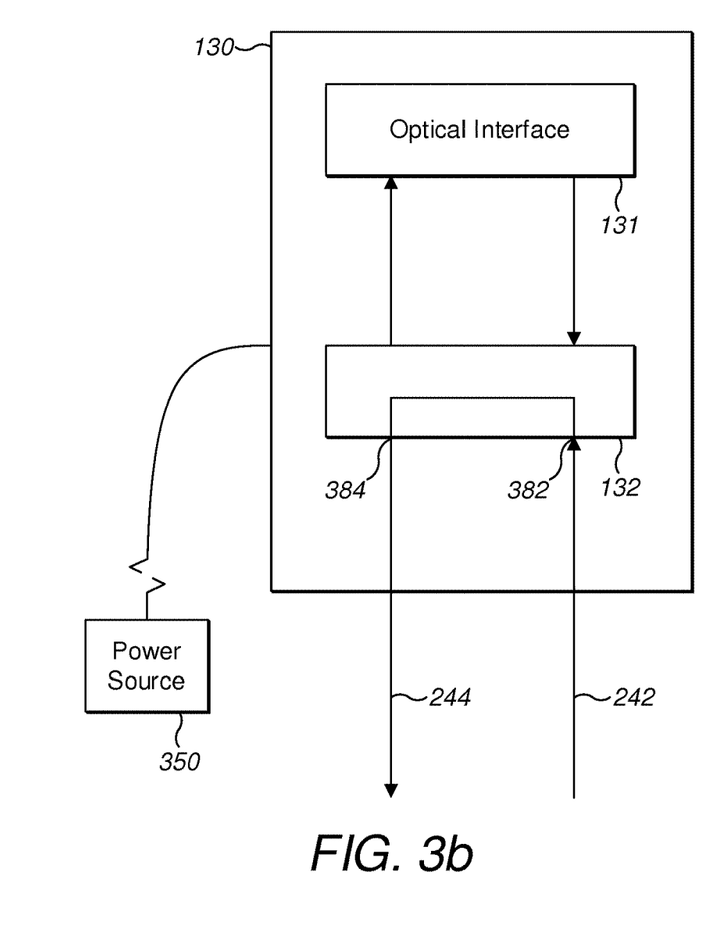
FIG. 3b schematically illustrates the remote site shown in FIG. 3a, but with a power failure.

FIG. 3*a* schematically illustrates a remote node 130 of the disclosure, in normal operation, e.g. a powered scenario. As shown in the figure, the remote node 130 comprises a remote optical interface unit 131 and an optical switch 132. FIG. 3*b* schematically illustrates the same remote node of the disclosure shown in FIG. 3*a*, but in a fault condition, e.g. with a power failure. Both FIGS. 3*a* and 3*b* are described together below.

The remote optical interface unit 131 is connected to the first optical fiber 242 and the second optical fiber 244 via the optical switch 132. The connection between the first optical fiber 242 and the optical switch 132 may be thought of as an optical input 382 of the remote node 130. Similarly, the connection between the second optical fiber 244 and the optical switch 132 may be thought of as an optical output of the remote node 130.

The remote node 130 is connected to a power source 350. The power source 350 is configured to power the optical interface unit 210, i.e. provide electrical power.

The optical switch 132 is configured to switch (or transition) to the first configuration when the remote optical interface unit 131 is powered on. The optical switch 132 is configured to remain in the first configuration whilst the remote optical interface unit 131 remains operational, e.g. powered on. Similarly, the optical switch 132 is configured to switch to the second configuration when the remote optical interface unit 131 is non-operational, e.g. powered off. The optical switch 132 is configured to remain in the second configuration whilst the remote optical interface unit 131 remains non-operational, e.g. powered off.

As can be seen in FIG. 3*b* the optical switch 132 is in the second configuration due to a power failure of the remote optical interface unit 131. In this example there is a break in the connection between the power source 350 and the remote node 130.

Typically, the first configuration of the optical switch 132 is a state in which the optical switch 131 is powered on, and the second configuration of the optical switch 131 is a state in which the optical switch 132 is powered off. The power source 350, which provides power to the remote optical interface unit 131, may also power the optical switch 132. As such, the power source 350 is a common power source for the optical switch 132 and remote optical interface unit 131, i.e. providing electrical power to both. In this way should the power source 350 fail, resulting in the remote optical interface unit 131 being powered off, then the optical switch 132 will also be powered off. Similarly, if the power source 350 is operational, and powering the remote optical interface unit 131, then the optical switch 132 will also be powered on. The optical switch 132 may be connected to the power source 350 via the remote optical interface unit 131.

As shown in FIG. 3*a*, when the optical switch is in the first configuration the optical switch connects (or provides an optical signal path between) the first optical fiber 242 and an input of the remote optical interface unit 131. Additionally, the optical switch 132 connects (or provides an optical signal path between) the second optical fiber 244 and an output of the optical interface unit 131. In this way the optical switch 132 in the first configuration may pass optical signals 125 received at the remote node 130 along the first optical fiber 242 to the remote optical interface unit 131. Similarly, the optical switch in the first configuration may pass optical signals 135 transmitted by the remote optical interface unit 131 along the first optical fiber 244. In other words, when the optical switch 132 is in the first configuration the optical switch 132 is configured to pass optical signals 125 received at the optical input 382 of the remote node 130 to the optical interface unit 131 and to pass optical signals 135 received from the optical interface unit 131 to the optical output 384 of the remote node 130.

As shown in FIG. 3*b*, when the optical switch is in the second configuration the optical switch connects (or provides an optical signal path between) the first optical fiber 242 and the second optical fiber 244. In this way the optical switch in the second configuration may pass optical signals 125 received at the remote node 130 along the first optical fiber 242, away from the remote node 130 along the second optical fiber 244. In effect, in the second configuration, the optical switch 132 may provide a loopback of optical signals 125 received at the remote node 130. In other words in the second configuration the optical switch 132 is configured to pass optical signals 125 received at the optical input 382 to the optical output 384.

Any suitable non-latching optical switch known in the art may be used. For example the optical switch could comprise, for example, any of: a photonic µ-ring (or microring) resonator (MRR) switch; a micro-electro-mechanical system (MEMS) switch; a piezoelectric optical switch; a liquid crystal optical switch; etc. Any type of switch which can be configured to change from the first to the second configuration on loss of power may be used for the optical switch 132.

As would be understood by the skilled person, a photonic microring resonator (MRR) switch (e.g. using silicon) may control the path of optical signals through the switch, i.e. by controlling the resonant frequency, e.g. by varying the refractive index of silicon in the switch. This can be achieved in a number of ways such as:

Thermo-Optic control: Here the refractive index of the material providing the waveguide, e.g. silicon, in the switch is changed by changing the temperature of the silicon. Such switches may have electric heaters for the micro-ring resonators to change the temperature of the microring resonator waveguides and thereby change the refractive index.

Electro-optic control: The refractive index of the waveguide, e.g. silicon, in switch is changed electronically. For example, heavily doped silicon is used. The refractive index of the heavily doped silicon can be changed by injecting electrons and holes through a p-i-n junction based on a plasma dispersion effect.

Optical Tuning: The refractive index is changed when high intensity laser beams pump the microring resonators. High intensity laser beam induces optical Kerr effect inside the microring resonator waveguides to change the refractive indexes of the waveguide.

Again, as would be understood by the skilled person, a MEMS optical switch uses mirrors to control the path of an optical signal through the switch. MEMS optical switches are usually of either an electrostatic or electromagnetic type. In an electrostatic MEMS optical switch mirrors are held in parallel plane, a first position, to underlying electrodes. When an electrode is charged at a different voltage level than that of its corresponding mirror, the mirror will be tilted down to it second position and thereby reflect a light beam to a different output fiber.

Switching of an electromagnetic MEMS optical switch involves attraction between electromagnets with different polarity.

As such, non-latching optical switches are known in the art they will not be described in further detail herein.

Figure 4A:
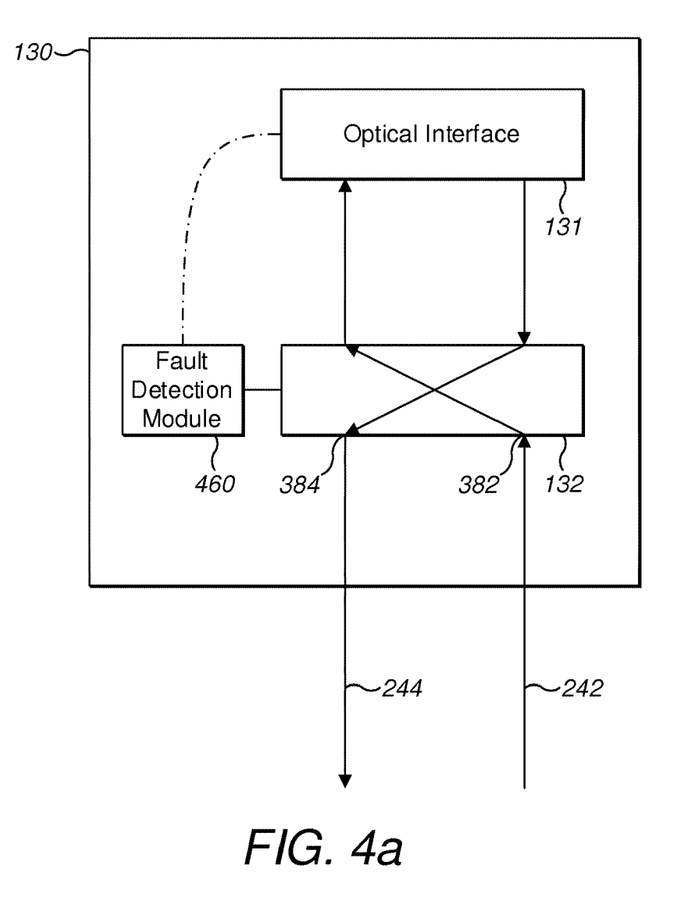
FIG. 4a schematically illustrates a variant remote site, in an operating scenario.
Figure 4B:
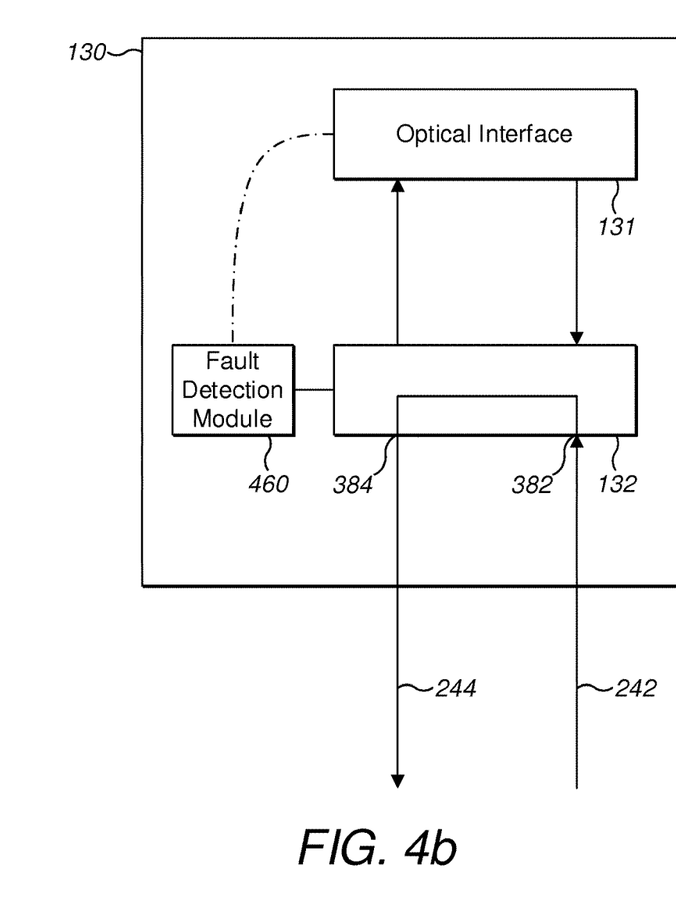
FIG. 4b schematically illustrates the remote site shown in FIG. 4a in a scenario where there is a fault on the optical interface.

FIGS. 4*a* and 4*b* schematically illustrate another remote node 130 of the disclosure with a fault detection unit 460. FIG. 4*a* schematically illustrates the remote node 130, in an operating scenario. FIG. 4*b* schematically illustrates the remote node 130 in a scenario where there is a fault on the remote optical interface unit 131. The discussions above regarding FIGS. 3*a* and 3*b* apply analogously, except in the differences noted below.

In particular, the remote node 130 comprises a fault detection unit 460 connected to the optical switch 132. The fault detection unit 460 is arranged to detect a failure state of the remote optical interface unit 131. A failure state of the remote optical interface unit 131 may be any state in which the remote optical interface unit 131 is prevented from (or unable to) transmitting optical signals 135 and/or receiving optical signals 125. Such a state may comprise a failure of a component of the remote optical interface unit 131, such as any one or more of a laser failure, an optical diode failure, waveguide (or optical fiber) damage within the optical receiver. The failure state may comprise a power failure of the remote optical interface unit 131 as described previously. The failure state may comprise a general failure at or relating to the remote node 130. For example, a loss of connection, and or failure of a system driving (or instructing) the remote optical interface unit 131.

The fault detection unit 460 may be arranged to detect a failure state of the remote optical interface unit 131 based on active probing (or polling) of the optical interface unit. For example, the fault detection unit 460 may periodically send signals (or messages) to the remote optical interface unit 131. In this case the remote optical interface unit 131 would be configured to respond indicating the absence (or optionally the presence) of a failure state. In the absence of a response from the remote optical interface unit 131 (or optionally should a response indicating a failure state be received by the fault detection unit 460), the fault detection unit 460 may determine that a fault is present.

Additionally, or alternatively, the fault detection unit 460 may be arranged to detect a failure state of the remote optical interface unit 131 based on passive probing of the remote optical interface unit 131. For example, the remote optical interface unit 131 may upon activation confirms activation by transmit a signal (or message) to the fault detection unit 460. Such a confirmation message may be arranged to expire in a given time interval. In this case, the remote optical interface unit 131 may be arranged to transmit a confirmation message periodically to the fault detection unit 460, providing the remote optical interface unit 131 is not in a fault state. In this way, the fault detection unit may detect a failure state of the remote optical interface unit 131 if no confirmation message is received by the fault detection unit 460 within the given time interval.

The fault detection unit 460 may be configured to carry out the above active and/or passive probing of the remote optical interface unit 131 via the optical switch 132. Additionally, or alternatively, the fault detection unit 460 may be configured to carry out the above active and/or passive probing of the remote optical interface unit 131 via an optional direct connection to the remote optical interface unit 131 (as shown by the dashed line in FIGS. 4a and 4b).

It will be appreciated that in detecting (or determining) a failure state of the remote optical interface unit 131, it will be sufficient for the fault detection unit 460 to detect that the remote optical interface unit 131 is in a failure state. The fault detection unit is typically not required to determine which particular failure state the remote optical interface unit 131 is in. Rather, the fault detection unit 460 usually is only required to distinguish between the remote optical interface unit 131 being in a failure state and the remote optical interface unit 131 being in an operational state.

The fault detection unit 460 is configured to, upon detecting that the remote optical interface unit 131 is in a failure state, transition (or switch) the optical switch 132 to second configuration, discussed previously. The fault detection unit 460 may be configured to, upon detecting that the remote optical interface unit 131 is no longer in a failure state (or that the remote optical interface unit 131 is in an operational state), transition the optical switch 132 to the first configuration.

In this way upon detecting that the remote optical interface unit 131 is in a failure state, the optical switch 132 again provides a loopback of optical signals 125 received at the remote node 130. Thus, a main node 120 connected to the remote node 130 via the fiber optic line 140 may again be able to distinguish between a failure of the remote optical interface unit 131, and a loss of continuity of the fiber optic line 140, as discussed previously.

As such, it will be appreciated that the use of the fault detection unit 460 in conjunction with the optical switch 132 in this embodiment provides an alternative mechanism of action to the power failure detection discussed above in relation to FIGS. 3a and 3b.

In addition, it will be appreciated that the fault detection unit 460 described above, may be used in combination with the variant described in relation to FIGS. 2a and 2b. In particular, when used in combination, a power failure of the remote optical interface unit 131 automatically results in the optical switch 132 transitioning to the second configuration and providing the described loopback of optical signals in a failsafe manner as discussed previously. By also including the fault detection unit 460 as described above, the described loopback of optical signals is also provided in the event of a failure of the optical interface unit which is not a power failure. In this way, situations where the main node 120 misinterprets a loss of signal due to a non-power failure of the remote optical interface unit as a loss of fiber continuity due to the absence of a looped back optical signal 125 may be avoided.

In the preceding description the remote optical interface unit 131 and the optical switch 132 are described as separate entities. It will be appreciated however, that the optical switch 132 may be integrated into the remote optical interface unit 131. Similarly, the fault detection unit 460 may also be integrated with the optical switch 132 and or the remote optical interface unit 131.

Figure 5:
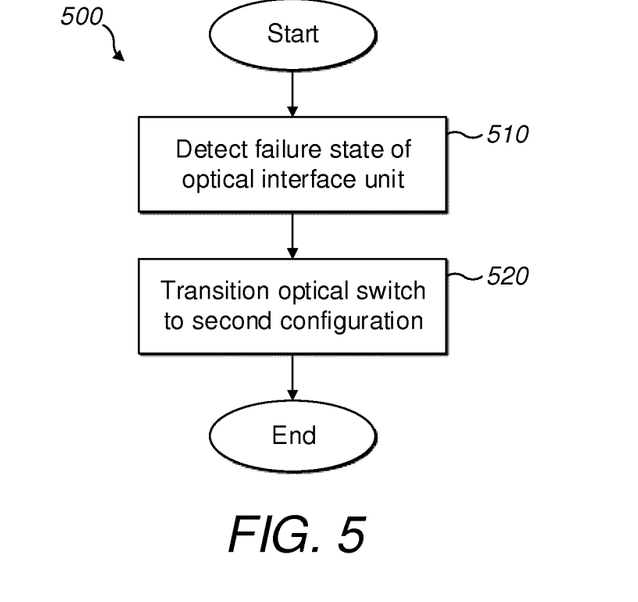
FIG. 5 shows a flowchart illustration a method of operation of a remote site as described in in relation to any of the previous figures.

FIG. 5 shows a flowchart illustration of a method 500 of operation of a remote node 130 as described in in relation to any of the previous figures.

At a step 510 a failure state of the optical node 130 is detected, e.g. by detecting a failure state of the remote optical interface unit 131. As described previously such detection may be based on active and/or passive probing of the remote optical interface unit 131. Additionally, or alternatively, the step of detection may be triggered by a power failure of the remote optical interface unit 131.

At a step 520 the optical switch 132 is transitioned (or switched) to the second configuration in which the optical switch 132 is configured to pass optical signals 125, received at the remote node 130 via the first optical fiber 242 of the fiber optic line 140, back along the second optical fiber 244 the fiber optic line 140.

It will be appreciated that the step 510 and the step 520 may be carried out, or controlled, by the fault detection unit 460 as described above.

Figure 6:
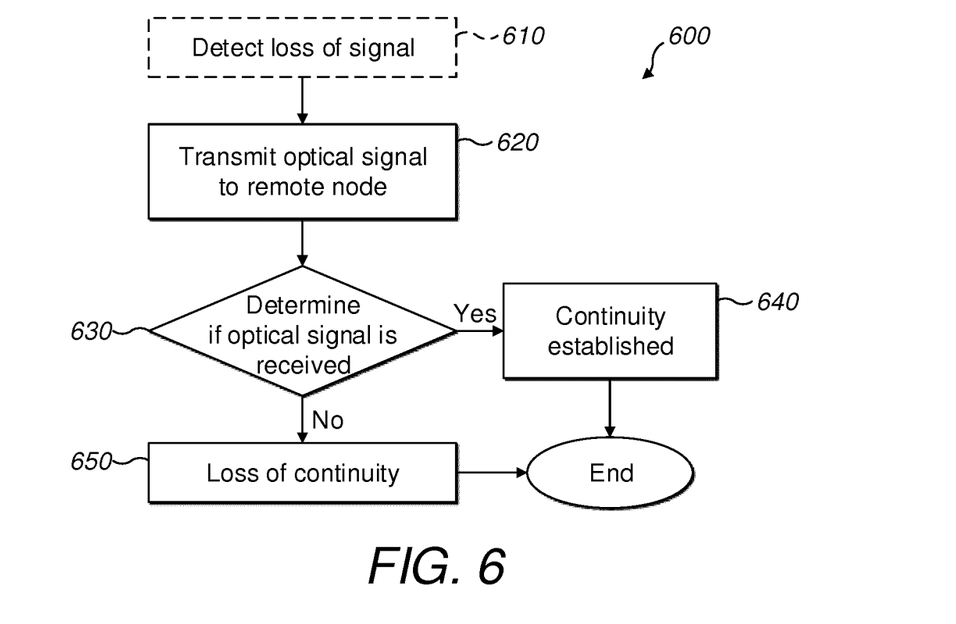
FIG. 6 shows a flowchart illustration a method of operation of a main site in communication with a remote site as described in any of the previous embodiments via a fiber optic line.

FIG. 6 shows a flowchart illustration a method of operation of a main node 120 in communication with a remote node 130 as described in any of the previous figures via the fiber optic line 140.

At an optional step 610 the main node 120 may detect a loss of signal at the main node 120 from the remote node 130. Such a loss of signal may be detected based on the absence of expected optical signals (or data traffic) from the remote node 130, for example in response to optical signals 125 sent from the main node. A loss of signal may be detected based on the absence of an expected carrier signal.

At a step 620 the main node 120 transmits an optical signal 125 towards the remote node 130 via the first optical fiber 242 of the fiber optic line 140. The optical signal 125 may comprise (or encode) data as described previously. In this way it will be appreciated that the optical signal 125 may be sent in step 620 in the course of usual data communication between the main node 120 and the remote node 130. Alternatively, the optical signal 125 sent in the step 620 may be a test signal, sent in response to detecting a loss of signal at step 610. Such test signal 125 may be a signal transmitted at a different, e.g. lower or higher, power than is usual on the particular fiber optic line 140. A test signal 125 where the signal is transmitted at a higher power than usual may be particularly advantageous in overcoming the greater signal attenuation (or degradation) that may be incurred when the optical signal travels along both the first optical fiber 242 and the second optical fiber 244. The test signal 125 may be (or comprise) a signal that has a higher sensitivity than is usual on the particular fiber optic line 140. For example, the test signal may be (or comprise) a simple tone, a square wave, a low frequency signal and so on.

At a step 630 the main node determines whether the optical signal 125 transmitted in the step 620 is received back at the main node 120. For example, the received optical signal 135 is analyzed to perform a comparison with the transmitted optical signal 125. If the transmitted signal is determined to be received back at the main node 120, then the method proceeds to a step 640, otherwise the method proceeds to the step 650.

At the step 640 in response to receiving at the main node 120 the optical signal 125 transmitted in the step 620, the main node 120 determines that the fiber optic line 140 has continuity. The main node may 120 also determine that the remote node 130 is in a failure state. In some examples, a fault signal may be transmitted indicating this fault.

At the step 650, in response to not receiving at the main node 120, the optical signal transmitted in the step 620, the main node 120 may determine that the fiber optic line 140 has lost continuity. In some examples, a fault signal may be transmitted indicating this fault.

In this way it is apparent that the loopback provided at the remote node 130 as described previously, enables the main node 120 to determine if the fiber optic line 140 has continuity.

Additionally, it will be appreciated that the use of a test signal as described above is further advantageous for fiber optic lines where, due to signal attenuation in the fiber optic line 140, a loopback optical signal 125 may not ordinarily be of sufficient strength to be detected at the main node 120. Thus, incorrect determinations of a loss of fiber continuity by the main node 120 may be avoided.

Figure 7:
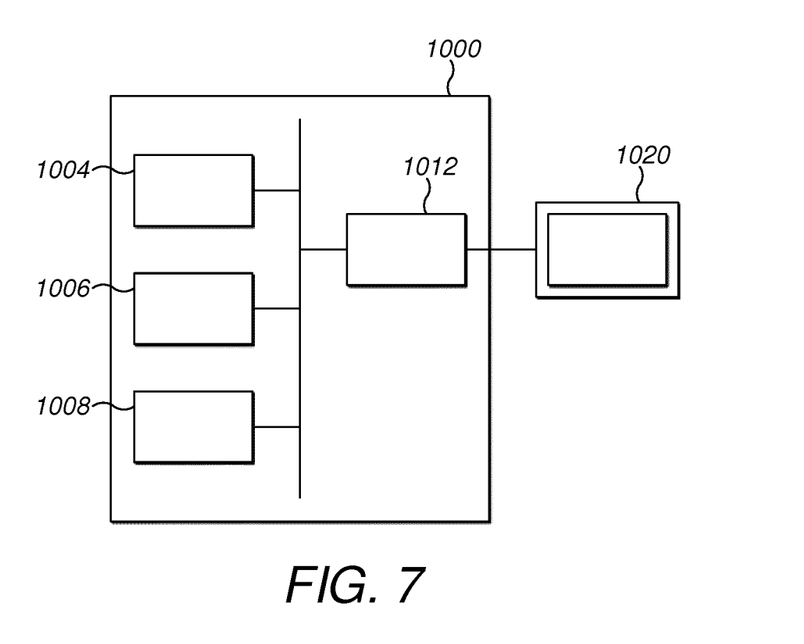
FIG. 7 schematically illustrates an example of a computer system.

FIG. 7 shows an example of a computer system 1000. The system 1000 comprises a memory 1006 connected to a processor 1008, and optionally an output interface 1012.

The memory 1006 may be any random access memory (storage unit or volatile storage medium) suitable for storing data and/or computer programs (or software or instructions or code).

The processor 1008 may be any data processing unit suitable for executing one or more computer programs, some of which may be computer programs according to embodiments of the disclosure or computer programs that, when executed by the processor 1008, cause the processor 1008 to carry out a method according to an embodiment of the disclosure. The processor 1008 may comprise a single data processing unit or multiple data processing units operating in parallel or in cooperation with each other. The processor 1008, in carrying out data processing operations for embodiments of the disclosure, may store data to and/or read data from a storage medium 1004 of the system and/or the memory 1006.

The output interface 1012 may be arranged to provide a graphical/visual and/or audio output to a user, or operator, of the system 1000. As such, the processor 1008 may be arranged to instruct the user output interface 1012 to form an image/video signal representing a desired graphical output, and to provide this signal to a monitor (or screen or display unit) 1020 of the system 1000 that is connected to the user output interface 1012.

A system such as the system 1000 may be (or be part of) the main node 120. In particular the system 1000 may be arranged to carry out the method as described above in relation to FIG. 6 above. In doing so the system 1000 may be connected to the optical interface unit 121 of the main node 120 so as to be enabled to receive and transmit optical signals via the optical interface unit 121 of the main node 120. In some aspects, the system 1000 is configured to indicate or transmit a fault indication which indicates whether the fault is in the optical fiber line or in the remote node.

In some aspects, a system such as the system 1000 may implement the fault detection unit 460 of the remote node 130 as described above. In particular the system 1000 may arranged to carry out the method as described above in relation to FIG. 5 above It will be appreciated that the architecture of the system 1000 illustrated in FIG. 7 and described above is merely exemplary and that other computer systems 1000 with different architectures (for example with fewer components than shown in FIG. 7 or with additional and/or alternative components than shown in FIG. 7) may be used in embodiments of the disclosure. As examples, the computer system 1000 could comprise one or more of: a personal computer; a server computer; a laptop; etc.

In the preceding description for ease of understanding the optical switch 132 has been discussed as being a separate component from the optical interface 131. It will be appreciated that in some embodiments of the disclosure the optical switch 132 may be integrated with (or into) the optical interface 131.

It will be appreciated that the methods described have been shown as individual steps carried out in a specific order. However, the skilled person will appreciate that these steps may be combined or carried out in a different order whilst still achieving the desired result.

It will be appreciated that embodiments of the disclosure may be implemented using a variety of different information processing systems. In particular, although the figures and the discussion thereof provide an exemplary computing system and methods, these are presented merely to provide a useful reference in discussing various aspects of the disclosure. Embodiments of the disclosure may be carried out on any suitable data processing device, such as a personal computer, laptop, server computer, etc. Of course, the description of the systems and methods has been simplified for purposes of discussion, and they are just one of many different types of system and method that may be used for embodiments of the disclosure. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the disclosure are implemented by a computer program, then a storage medium and a transmission medium carrying the computer program form aspects of the disclosure. The computer program may have one or more program instructions, or program code, which, when executed by a computer carries out an embodiment of the disclosure. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. An apparatus for fiber optic line fault determination comprising:
   an optical input connectable to a first optical fiber of a fiber optic line;
   an optical output connectable to a second optical fiber of the fiber optic line;
   an optical interface unit configured to transmit and receive optical signals; and
   an optical switch having a first configuration and a second configuration, wherein in the first configuration the optical switch is configured to pass optical signals received at the optical input to the optical interface unit and to pass optical signals received from the optical interface unit to the optical output, and
   in the second configuration the optical switch is configured to pass optical signals received at the optical input to the optical output;
   wherein the optical switch is arranged to transition from the first configuration to the second configuration in response to the optical interface unit being in a failure state, and
   wherein the failure state of the optical interface unit comprises a loss of power at the optical interface unit that indicates a break in a connection between a power source and the optical interface unit.

2. The apparatus of claim 1, wherein the optical switch and the optical interface unit are arranged to use a common power source.

3. The apparatus of claim 1, wherein the second configuration of the optical switch corresponds to the optical switch being powered down.

4. The apparatus of claim 1, wherein the failure state of the optical interface unit comprises one of an optical diode failure or a laser failure.

5. The apparatus of claim 1 further comprising a fault detection unit configured to detect the failure state.

6. The apparatus of claim 5, wherein the fault detection unit is configured to detect the failure state based on active probing of the optical interface unit.

7. The apparatus of claim 6, wherein the active probing comprises polling the optical interface unit.

8. The apparatus of claim 7, wherein the fault detection unit is configured to detect the failure state based on passive probing of the optical interface unit.

9. The apparatus of claim 1, wherein the optical switch comprises a photonic microring resonator optical switch, wherein the photonic microring resonator optical switch is configured to transition between the first configuration and the second configuration using any one of:
   thermo-optic control;
   electro-optic control; or
   optical tuning.

10. The apparatus of claim 1, wherein the optical switch comprises a microelectromechanical system, MEMS, optical switch.

11. A method of operating an optical node connected to a fiber optic line comprising a first optical fiber and a second optical fiber, the method comprising:
   detecting a failure state of the optical node, and in response to the optical node being in the failure state, transitioning an optical switch of the optical node to a configuration in which the optical switch is configured to pass optical signals, received at the first optical fiber, along the second optical fiber, wherein the failure state of the optical node comprises a loss of power at an optical interface unit of the optical node that indicates a break in a connection between a power source and the optical interface unit.

12. A method of operating a fiber optic communication system comprising a local optical node connected to a remote optical node via a fiber optic line comprising a first optical fiber and a second optical fiber, the method comprising:
   at the remote optical node:
      in response to the remote optical node being in a failure state, transitioning an optical switch of the remote optical node to a configuration passing optical signals received at the remote optical node from the local optical node via the first optical fiber to the second optical fiber for transmission to the local optical node,
         wherein the failure state of the remote optical node comprises a loss of power at an optical interface unit of the remote optical node that indicates a break in a connection between a power source and the optical interface unit; and
   at the local optical node:
      transmitting a signal from the local optical node towards the remote optical node via the first optical fiber; and
      determining if the transmitted signal is received at the local optical node via the second optical fiber of the fiber optic line, and if so, determining that the fiber optic line has continuity.

13. The method of claim 12, wherein the signal is a test signal, and the transmitting of the test signal is in response to detecting a loss of signal at the local optical node.

14. The method of claim 12, wherein the optical switch and the optical interface unit are powered by a common power source.

15. The method of claim 12, wherein the configuration of the optical switch corresponds to the optical switch being powered down.

16. The method of claim 12, wherein failure state of the remote optical node comprises one of an optical diode failure or a laser failure in an optical interface unit of the remote optical node.

17. A system for fiber optic line fault determination, the system comprising:
   a local optical node connected to a remote optical node by a first optical fiber and a second optical fiber;
   the remote optical node comprising a remote optical interface unit connected to the first optical fiber and the second optical fiber via an optical switch; and
   the local optical node comprising a local optical interface unit connected to the first optical fiber and the second optical fiber;
   wherein the optical switch has a first configuration and a second configuration, wherein in the first configuration the optical switch is configured to optically connect the first optical fiber to the remote optical interface unit, and to optically connect the second optical fiber to the remote optical interface unit enabling the remote optical interface unit to transmit and receive optical signals via the first optical fiber and the second optical fiber to the local optical interface unit,
   wherein in the second configuration the optical switch is configured to optically connect the first optical fiber to the second optical fiber such that incoming optical signals from the local optical interface unit via the first optical fiber are redirected to the local optical interface unit via the second optical fiber;

wherein the optical switch is arranged to transition from the first configuration to the second configuration in response to the remote optical interface unit being in a failure state, and wherein the failure state of the remote optical interface unit comprises a loss of power at the remote optical interface unit that indicates a break in a connection between a power source and the remote optical interface unit.

\* \* \* \* \*

UNITED STATES PATENT AND TRADEMARK OFFICE
CERTIFICATE OF CORRECTION

| | |
|---|---|
| PATENT NO. | : 11,296,785 B2 |
| APPLICATION NO. | : 16/962013 |
| DATED | : April 5, 2022 |
| INVENTOR(S) | : Roberto Magri et al. |

It is certified that error appears in the above-identified patent and that said Letters Patent is hereby corrected as shown below:

On the Title Page

"(72) Inventors: Roberto Magri, Genoa (IT); Alberto Deho, Genoa (IT)"
Should read:
-- (72) Inventors: Roberto Magri, Genova (IT); Alberto Deho, Genova (IT) --.

Signed and Sealed this
Thirteenth Day of December, 2022

Katherine Kelly Vidal
*Director of the United States Patent and Trademark Office*